J. C. BASCUE.
STALK CUTTER.
APPLICATION FILED FEB. 16, 1909.

1,007,631.

Patented Oct. 31, 1911.

2 SHEETS—SHEET 1.

Witnesses
C. K. Reichenbach.
J. R. Umholtz

Inventor
John C. Bascue,
By Edmund H. Parry
Attorney

COLUMBIA PLANOGRAPH CO., WASHINGTON, D. C.

J. C. BASCUE.
STALK CUTTER.
APPLICATION FILED FEB. 16, 1909.
1,007,631.
Patented Oct. 31, 1911.
2 SHEETS—SHEET 2.
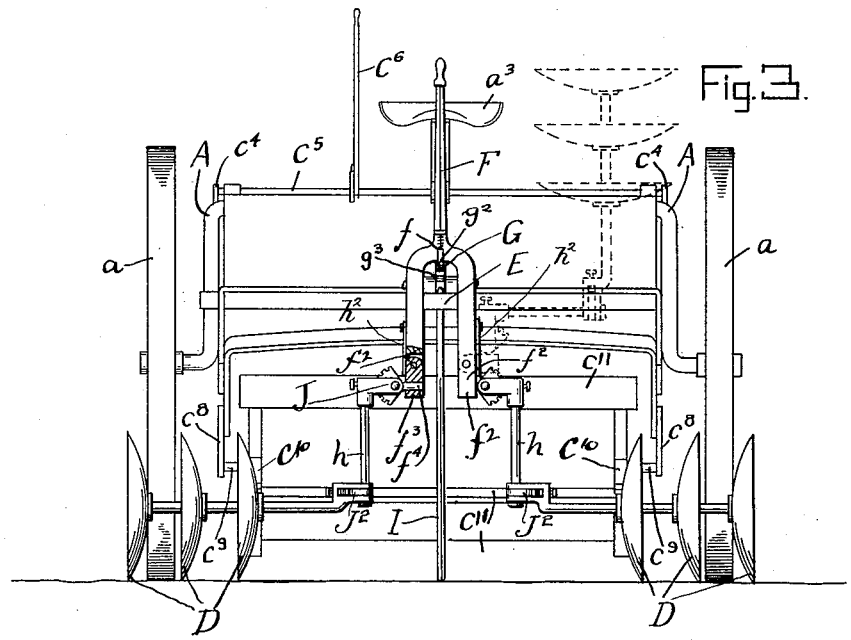
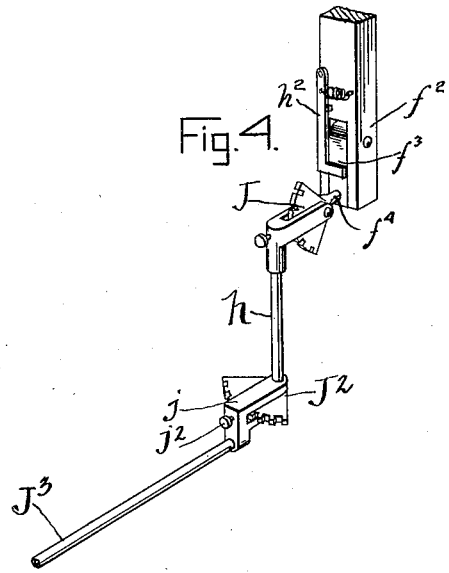
WITNESSES
E. K. Reichenbach
J. R. Umholtz
INVENTOR
John C. Bascue,
by Edmund H. Parry
Attorney.

UNITED STATES PATENT OFFICE.

JOHN CALVIN BASCUE, OF KINGSTON, MISSOURI.

STALK-CUTTER.

,007,631.

Specification of Letters Patent.

Patented Oct. 31, 1911.

Application filed February 16, 1909. Serial No. 478,243.

*To all whom it may concern:*

Be it known that I, JOHN C. BASCUE, citizen of the United States, residing at Kingston, in the county of Caldwell and State of Missouri, have invented certain new and useful Improvements in Stalk-Cutters, of which the following is a specification.

My invention relates to stalk-cutters.

The object of my invention is to present a revoluble stalk-cutter which is capable of being utilized for a plurality of purposes and upon ground of any nature, whether level or uneven.

It is a further object of my invention to combine a stalk-cutter and a disk-cultivator, whereby the stalks lying in the direction of travel may not only be cut, centrally, by the stalk-cutter (as its individual and regular function) and by the cultivator-disks (as auxiliary stalk-cutters of stalks lying transversely); but, at the same time, the said cultivator-disks will also perform their own regular function of cultivating the ground preparatory to planting seed, etc.

It is a further object of my invention to so arrange the parts upon the supporting-vehicle that the weight of all will advantageously be poised and counterpoised, whereby the pressure, strain and pull which would ordinarily become imposed upon the horse are practically avoided.

With these objects in view, the invention besides, primarily, in a revoluble stalk-cutter disposed toward the rear of the center of the supporting-vehicle, and disk-cultivators or disk-harrows supported on shafts to the front of such central part of the vehicle, such disks being dish-shaped and the concavity in which faces outward.

The invention resides, furthermore, in means for positioning said disks toward and away from the ground, quickly and conveniently, whereby the operator may secure the best results at all times no matter what may be the character of the ground being cultivated.

The invention consists, also, in various novel details of arrangement and construction, all as fully hereinafter described.

Figure 1:
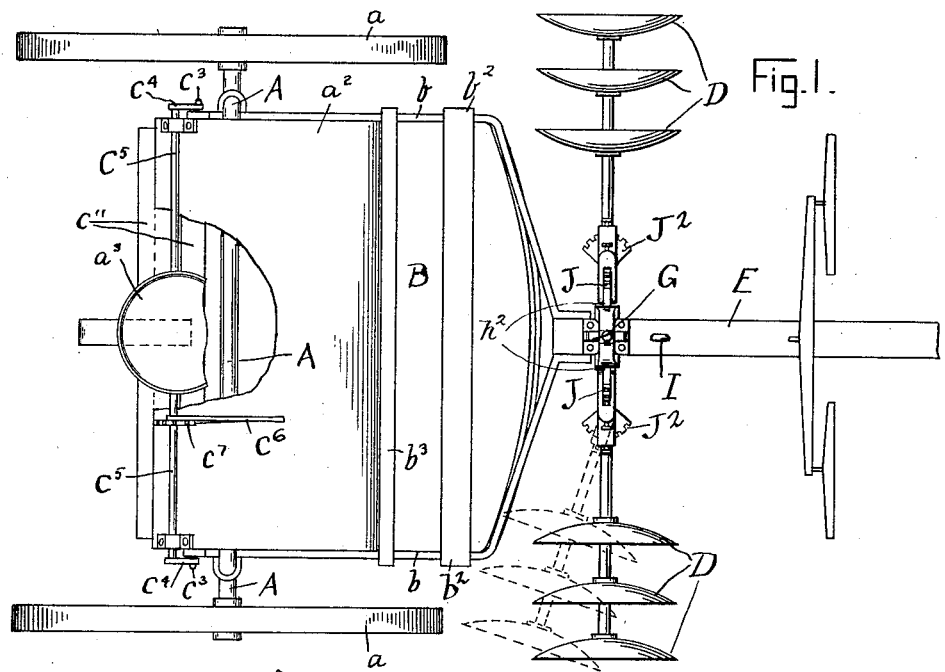
Figure 2:
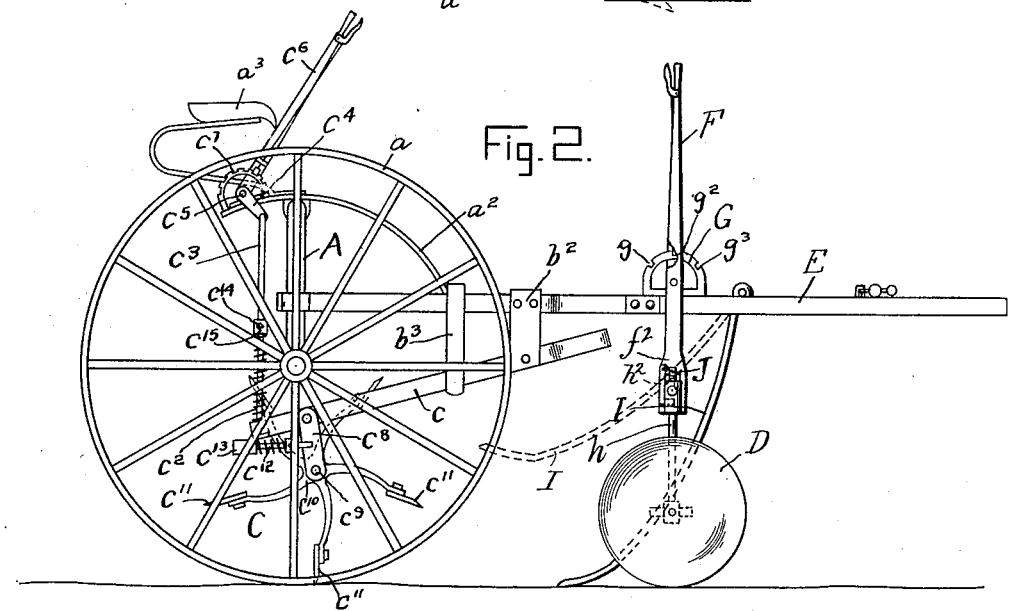

In the accompanying drawings, forming a part of this specification, and wherein like letters of reference indicate corresponding parts, I have illustrated a preferred embodiment of my invention; and in these drawings, Figure 1 is a view in plan of my invention showing, particularly, the relative arrangement of the cutters; Fig. 2 is a view in side elevation thereof; Fig. 3 is a view in front elevation; Fig. 4 is a fragmentary view in perspective of a portion of the disk-supporting and positioning structure.

In the drawings, I have illustrated the stalk-cutter and disk-harrows as applied to a well-known form of cultivator-vehicle, wherein A represents the usual arched axle provided with ground or supporting wheels $a$, $a$. Secured to the arch of said axle is a platform $a^2$ above which is mounted a spring-supported seat $a^3$.

The main frame of the vehicle is designated B, and comprises a frame $b$ suitably secured, at the sides, to the vertical members of the arched axle. Suspended from said frame $b$, as by the brackets $b^2$, $b^2$, is a three-sided cutter-supporting frame $c$, said frame being, preferably, pivoted at its front to the brackets $b^2$, $b^2$, and held in position and guided by the depending lugs $b^3$, $b^3$. To the rear-portion of the side-members of said cutter-supporting frame are secured the lower ends of springs $c^2$, $c^2$, the upper ends of said springs connecting with links $c^3$, $c^3$, attached to crank-arms $c^4$, carried at the ends of a rock-shaft $c^5$ operated by a cutter-positioning lever $c^6$, contiguous to which is disposed a sector $c^7$ whereby the position of said lever may be determined and its locking effected. Suspended from said frame $c$, as by brackets $c^8$, $c^8$, are short transverse pintles $c^9$, $c^9$ for supporting the cutter C comprising heads $c^{10}$, $c^{10}$, and a plurality of transversely-arranged cutting-knives or blades, $c^{11}$, $c^{11}$, $c^{11}$.

By the arrangement shown and just described, as will be obvious, the lowering and raising of the cutter is conveniently and quickly accomplished: When the lever is thrown forward and locked, it is ready for work, and, when thrown backward, the cutter is elevated away from the ground. In this construction, I prefer not to utilize a shaft for the cutter, because I thereby avoid the usual trouble arising from weeds, vines, etc., wrapping around the shaft that is usually employed, resulting in binding and filling up of the head. Moreover, the use of the springs $c^2$, $c^2$, relieves the shock on the operator. To relieve shock of cutting on the team, I may provide another set of springs, $c^{12}$, $c^{12}$, connecting with the brackets $c^8$, and with rear brackets $c^{13}$, $c^{13}$. The springs connecting the cutter admit of putting as much or as little weight on the knives as may be desired.

To provide for adjustment of the cutter vertically, a set-screw $c^{14}$ on the spring-head $c^{15}$ and engaging the links $c^3$ is provided. When the said set screws at each side are loosened, the spring-heads may be moved up or down, and, by reason of their connection to the frame $c$ (which, as shown, is fulcrumed at the lowered ends of the brackets $b^2$) said frame may be raised or lowered, as necessary, and retained in its adjusted position by said set screw.

The cutter C performs its usual function of cutting corn-stalks, cotton or other kinds of stalks; but it is manifest that its zone of operation is limited to the length of the blades, and, to a certain extent, to the stalks, etc., lying in the direction of travel.

To enlarge upon the zone of cutting-operation of the construction, I provide the cultivator or harrow disks D, D, D, (preferably three or more) at each side of the outside line of cutting of the cutter. Each of these disks is dished and faces outward in order that the dirt may be thrown outward and, thus, cause the ground to assume a more level character. The number of disks (at least three) on each side enables the implement not only to cut the stalks into shorter lengths, but at the same time better prepares the ground for subsequent planting of seed, etc. Moreover, for these important results, I dispose these disks in a position considerably in advance of the position of the main cutter C, and this for the purpose of cutting the stalks lying crosswise to the direction of travel of the vehicle (and before the cutter C operates to cut the stalks, etc., lying longitudinally of the direction of travel) and, also, for cutting stalks, limbs, etc., lying closest to the ground.

I will now describe the supporting and positioning structure for the cultivator-disks D: Projecting forward from the frame of the vehicle is the usual tongue E, which I prefer to make longer than usual. Pivoted upon and toward the rear end of the tongue is a positioning-lever F, the same being bifurcated at its lower end to straddle the tongue. Carried by this lever is a spring-member $f$ designed to engage in notches $g$, $g^2$, $g^3$, in a sector G secured to the top of the tongue and between the members $f^2$, $f^2$ of the bifurcated lever. Each of the lower ends of these members $f^2$, $f^2$ is recessed to receive a pivot-block $f^3$ in which is supported an arm $f^4$ carrying a segment-member J, to the inner end of which is pivoted an angulated arm $h$ which carries a sliding dog to engage in notches in said segment-member. The arm $h$ also carries at its lower ends a segment-member $J^2$. A horizontal, outwardly-extending shaft $J^3$ is fulcrumed on the arm $h$, and is provided with a bifurcated end $j$ which straddles the member $J^2$ and carries a sliding dog $j^2$ to engage in one or another of the notches in the segment-plate $J^2$. On said shaft a plurality of dished cutter-disks D, D, D, are rotatably mounted, there being at least three of these on each shaft at each side.

It will be understood that the shafts have no rotary movement, but the disks are revolubly disposed thereon. The arms or offsets $h$ enable the disks to be disposed in a lower plane relative to the point of attachment of the arms to the pivot-blocks, and the pivotal arrangement of the segment-members $J^2$ and shafts $J^3$ permit the positioning of said shafts at an angle, as shown in dotted lines in Fig. 1, relative to each other and to the cutter C. The innermost disk is outside the line of the cutter C, and the outermost disk is outside the line of the vehicle wheel.

By means of the pivot-blocks, the arms and disks may be tilted up out of the way. To hold them in either operative or inoperative position, a spring catch $h^2$ is pivoted on the side of the member $f^2$, the angular portion of this catch engaging under the pivot-block when the arm is tilted, and also bearing down on the top of the arm when the arm is in its horizontal position. By means of the lever F, both sets of disks may be positioned to or away from the ground: When the lever is in its rearmost position and locked in a notch in the sector, the disks occupy a position slightly above the surface of the ground. When the lever is thrown forward, the sets of disks are lowered to the ground and will remain so until positioned away therefrom.

Suitably connected to the tongue, or other suitable part, is a slide-runner I designed to hold the weight of the parts off the necks of the horses when moving. This runner is pivoted so that it can be tilted up out of the way when not in use.

By the construction and arrangement of parts shown, and the use of the slide-runner, already referred to, the weight of the tongue, frame and parts of the structure is poised and held off the necks of the animals. The cutter and disks cut stalks in the path of travel,—the disks (being in the front) operating to cut all that the cutter behind would miss, and, at the same time, cuts the surface of the ground so that it can thereafter be more easily plowed and worked. The disks being equi-distant, and there being three on each side, they will cover two-thirds of the ground between the ordinary corn-rows, thus leaving the ground in fine condition for sowing oats, timothy or other small seeds. A less number of disks, and differently disposed and shaped, would not thus operate. The disk-positioning-device, in connection with the tilting capacity of the disk-arms, permit the disks to be raised and held up out of the way without necessitating detachment thereof. My structure, therefore, possesses many and important advantages.

Having described my invention, what I claim is:

1. In combination, a wheeled supporting-frame, a plurality of series of rotating cutter-members sustained thereby, some of said plurality of series being arranged in advance of other of said cutting-members and all normally at substantially right angles to the line of draft of said frame, angulated supports movably connecting with said supporting-frame and adapted, when shifted, to position the cutter-members carried by said supports at an angle and in a different plane to their normal position, and means also carried by said frame for simultaneously positioning a plurality of said cutting-members.

2. In combination, a wheeled supporting-frame, a plurality of series of rotating cutting-members independently sustained by said frame and including a single set of cutting-members disposed at the rear of said frame and two sets of cutter-disks arranged in front of said single set and in approximate transverse alinement with each other and normally at substantially right angles to the line of draft and shiftable to positions at an angle to said line of draft, angulated supporting-members by which said disks are movably supported and positioned independently of each other, and means common to both sets for simultaneously positioning them toward and away from the ground.

3. In a stalk-cutter, the combination with a supporting-frame, sets of triple cutter-disks, tiltable and horizontally-swinging arms upon which the disks are rotatably disposed, spring latches for holding said arms in position when tilted, means for holding said arms in any of their horizontally-shiftable positions, a lever to which said arms are connected and by which they are manipulated, and means for locking said lever in position.

4. In a stalk-cutter, the combination with a supporting-frame, sets of triple cutter-disks, tiltable and horizontally-swinging arms upon which the disks are rotatably disposed, spring latches for holding said arms in position when tilted, means for holding said arms in any of their horizontally-shiftable positions, a lever to which said arms are connected and by which they are manipulated, means for locking said lever in position, and a depending slide-runner for sustaining the weight of the parts of the structure.

5. In a stalk-cutter, the combination with a supporting-frame, sets of triple cutter-disks, tiltable arms upon which the disks are rotatably disposed, spring latches for holding said arms in position, a lever to which said arms are connected and by which they are manipulated, means for locking said lever in position, and a depending slide-runner for sustaining the weight of the parts of the structure; said runner being tiltable to remove it out of operating position.

In testimony whereof I have affixed my signature, in presence of two witnesses.

JOHN CALVIN BASCUE.

Witnesses:
ROBT. McFEE,
W. H. BASCUE.

Copies of this patent may be obtained for five cents each, by addressing the "Commissioner of Patents, Washington, D. C."